United States Patent
Kwon

(10) Patent No.: US 8,833,799 B2
(45) Date of Patent: Sep. 16, 2014

(54) STEERING COLUMN FOR VEHICLE

(71) Applicant: Mando Corporation, Pyeongtaek-si (KR)

(72) Inventor: Hyun Bi Kwon, Yongin-si (KR)

(73) Assignee: Mando Corporation, Pyeongtaek-Si, Gyeonggi-Do (KR)

( * ) Notice: Subject to any disclaimer, the term of this patent is extended or adjusted under 35 U.S.C. 154(b) by 0 days.

(21) Appl. No.: 14/176,312

(22) Filed: Feb. 10, 2014

(65) Prior Publication Data

US 2014/0230596 A1 Aug. 21, 2014

(30) Foreign Application Priority Data

Feb. 21, 2013 (KR) .......................... 10-2013-0018522

(51) Int. Cl.
*B62D 1/11* (2006.01)
*B62D 1/19* (2006.01)

(52) U.S. Cl.
CPC ...................................... *B62D 1/195* (2013.01)
USPC ........................................................ 280/777

(58) Field of Classification Search
CPC ................................ B62D 1/192; B62D 1/195
USPC .............................. 280/777, 779; 74/492, 493
See application file for complete search history.

(56) References Cited

U.S. PATENT DOCUMENTS

| | | | | |
|---|---|---|---|---|
| 5,470,107 | A * | 11/1995 | Muntener et al. | 280/777 |
| 6,523,432 | B1* | 2/2003 | Yamamoto et al. | 74/492 |
| 7,125,047 | B2* | 10/2006 | Lee | 280/777 |
| 7,607,694 | B2* | 10/2009 | Shinohara et al. | 280/775 |
| 2002/0033593 | A1* | 3/2002 | Hancock et al. | 280/777 |
| 2002/0053252 | A1* | 5/2002 | Duffy | 74/492 |
| 2003/0000330 | A1* | 1/2003 | Murakami et al. | 74/492 |
| 2006/0186658 | A1* | 8/2006 | Yasuhara et al. | 280/775 |
| 2008/0100050 | A1* | 5/2008 | Menjak et al. | 280/777 |
| 2008/0238071 | A1* | 10/2008 | Oh | 280/777 |

* cited by examiner

*Primary Examiner* — Faye M Fleming
*Assistant Examiner* — Robert A Coker
(74) *Attorney, Agent, or Firm* — Lowe Hauptman & Ham, LLP

(57) ABSTRACT

Disclosed herein is a steering column for a vehicle. In a steering column (10) including an outer tube (100) accommodating a steering shaft (P), an inner tube (200) retracted into the outer tube (100), a main bracket (300) installed to the outer tube (100) and fixed to a vehicle body, a telescopic bracket (400) integrally fixed to the outer tube (100) and formed with a pair of slots for telescoping (410), and a position fixing bolt (600) installed through the slots for telescoping (410), wherein the telescopic bracket (400) is further formed with a slot for energy absorption (420) extending from at least one of the pair of slots for telescoping (410) and having a height (h) smaller than a diameter (D) of the position fixing bolt (600), thereby enabling impact energy to be absorbed by means of friction with the position fixing bolt during a vehicle impact.

6 Claims, 9 Drawing Sheets

STEERING COLUMN FOR VEHICLE

CROSS-REFERENCE(S) TO RELATED APPLICATIONS

This application claims priority to Korean Patent Application No. 10-2013-0018522, filed on Feb. 21, 2014, the disclosure of which is incorporated herein by reference in its entirety.

BACKGROUND OF THE INVENTION

1. Field of the Invention

Exemplary embodiments of the present invention relate to a steering column for a vehicle, and more particularly, to a steering column for a vehicle capable of reducing driver's injuries by properly absorbing an impact caused in the event of a collision or rear-end accident of a vehicle.

2. Description of the Related Art

A steering system for a vehicle is a device which steers a vehicle for arbitrarily changing a forward direction of the vehicle. Such a steering system includes an operation mechanism, a gearing or a power cylinder, and a link mechanism, wherein the operation mechanism is configured by a steering wheel which is directly operated by a driver in order for the driver to change the forward direction of the vehicle, a steering shaft which is rotatably and integrally connected to the steering wheel to transfer torque of the steering wheel, a steering column which allows the steering shaft to be mounted to a vehicle body, and the like, the gearing reduces rotation of the steering shaft to increase operating force of the steering wheel and simultaneously changes a motion direction of the operation mechanism to transfer the same to the link mechanism, the power cylinder is hydraulically operated to assist a driver in operating the steering wheel, and the link mechanism is configured by a pitman arm, a drag arm, a knuckle arm, a tie rod, and the like in order to transfer operation of the gearing or power cylinder to front wheels while correctly supporting a relation position between left and right wheels.

In the event of a collision or rear-end accident of the vehicle to which the above-mentioned steering system is mounted, a driver's upper body directly strikes the steering wheel and the driver is seriously injured. Accordingly, in order to reduce such a driver's injury, there have been proposed a variety of buffer devices or buffer structures installed to the steering wheel, the steering column, or the like.

In addition, the conventional steering system has a tilt function by which the steering shaft may be tilted in forward and backward directions of the vehicle body by a predetermined angle in order to provide a more convenient operation environment of the steering wheel for a driver according to the body type thereof, a telescopic function by which the steering wheel may be pulled close to a driver's body or pushed downward to be away therefrom, or the like.

Here, in the steering system having only the tilt function, there has been proposed a buffer device or a buffer structure, such as a capsule which is installed to a part of the vehicle body equipped with the steering column so as to absorb an impact by being decoupled from the vehicle body when an impact more than a predetermined level is applied thereto, a press-fit friction structure in which a predetermined part of an outer tube fitted with an inner tube is cut and folded in the inner tube to be pressed against the inner tube so that an impact is absorbed by friction generated during relative movement between the tubes, or a molding pin which is installed to the steering shaft and absorbs an impact by being broken when the steering shaft is axially moved by an impact applied thereto.

Moreover, in the steering system simultaneously having the tilt function and the telescopic function, the above-mentioned molding pin cannot be used since a buffer device or a buffer structure has to be constituted such that an upper steering shaft and a lower steering shaft may be moved relative to each other. Accordingly, a buffer structure adopting the capsule which absorbs an impact by being decoupled from the vehicle body when an impact more than a predetermined level is applied thereto has generally been applied to the steering system. Here, the buffer structure to which the capsule is applied is disclosed in Korean Patent Publication No. 10-0798851.

Meanwhile, FIG. 1 shows an example of a steering system simultaneously having a tilt function and a telescopic function. FIG. 2 shows a component portion for tilt and telescopic functions. FIG. 3 shows a state of the component portion for tilt and telescopic functions shown in FIG. 2 when viewed from the bottom.

As shown in FIGS. 1 to 3, a steering column 10 in the steering system simultaneously having the conventional tilt function and telescopic function includes an outer tube 100 accommodating a steering shaft P, an inner tube 200 retracted into the outer tube 100, a main bracket 300 which is installed to the outer tube 100 and fixed to a vehicle body, a telescopic bracket 400 which is integrally fixed to the outer tube 100 and formed with a slot for telescoping 410, a tilt bracket 500 which is formed integrally with the main bracket 300 and formed with a slot for tilting 510, a position fixing bolt 600 installed through the slot for tilting 510 and the slot for telescoping 410, and an adjustment lever 700 which is joined to various gearings (not shown) installed to the tilt bracket 500 for the tilt and telescopic functions to control available and unavailable conditions of the tilt and telescopic functions.

In the configuration described above, when the adjustment lever 700 is pushed and the outer tube 100 is moved in a direction indicated by an arrow A for telescopic adjustment, the movement of the outer tube 100 is limited up to positions at which the position fixing bolt 600 is caught by both ends of the slot for telescoping 410.

However, in a case of the above-configured conventional steering system simultaneously having the tilt and telescopic functions, the component portion for tilt and telescopic functions is constituted independently from a component portion serving as a buffer function for the steering column during a vehicle impact. Therefore, since a large number of parts are used, there are problems in that assembly processes are complicated and manufacturing costs are increased.

In addition, the conventional buffer structure using the capsule instantly absorbs an impact load during the vehicle impact. Consequently, it may be impossible to efficiently realize impact absorption since times of action of an impact load may not be adapted in a multistage manner required to obtain a larger impact absorbing effect.

SUMMARY OF THE INVENTION

An object of the present invention is to provide a steering column for a vehicle, capable of reducing manufacturing costs by a reduction in assembly processes according to a reduction in the number of parts by additionally forming a slot for energy absorption extending from a slot for telescoping on a telescopic bracket to absorb energy during a vehicle impact by means of friction between the slot for energy absorption and a position fixing bolt, and capable of efficiently realizing impact absorption since times of action of an impact load may be adapted in a multistage manner by constituting the slot for energy absorption in a multistage structure.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, in a steering column for a vehicle including an outer tube which accommodates a steering shaft, an inner tube retracted into the outer tube, a main bracket which is installed to the outer tube and fixed to a vehicle body, a telescopic bracket which is integrally fixed to the outer tube and formed with a pair of slots for telescoping, and a position fixing bolt installed through the slots for telescoping, wherein the telescopic bracket is further formed with a slot for energy absorption which extends from at least one of the pair of slots for telescoping and has a height smaller than a diameter of the position fixing bolt, thereby enabling impact energy to be absorbed by means of friction with the position fixing bolt during a vehicle impact.

The slot for energy absorption may be formed in a multistage structure including at least two or more partial slots, heights of which are gradually decreased as the partial slots are away from the slot for telescoping.

An introduction portion of the slot for energy absorption may be formed with a stopper member preventing the position fixing bolt from being located in the slot for energy absorption before an impact more than a certain level is applied to the steering shaft.

The stopper member may be formed in a thin wall shape which is capable of being broken such that the position fixing bolt is able to be located inside the slot for energy absorption when an impact more than a certain level is applied to the steering shaft.

The stopper member may be formed with a breaking guide groove leading to breakage of the stopper member when an impact more than a certain level is applied to the steering shaft.

The slot for energy absorption may be configured of a pair of slots for energy absorption such that the slots for energy absorption respectively extend from both of the pair of slots for telescoping and are formed to have lengths different from each other.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

Figure 1:
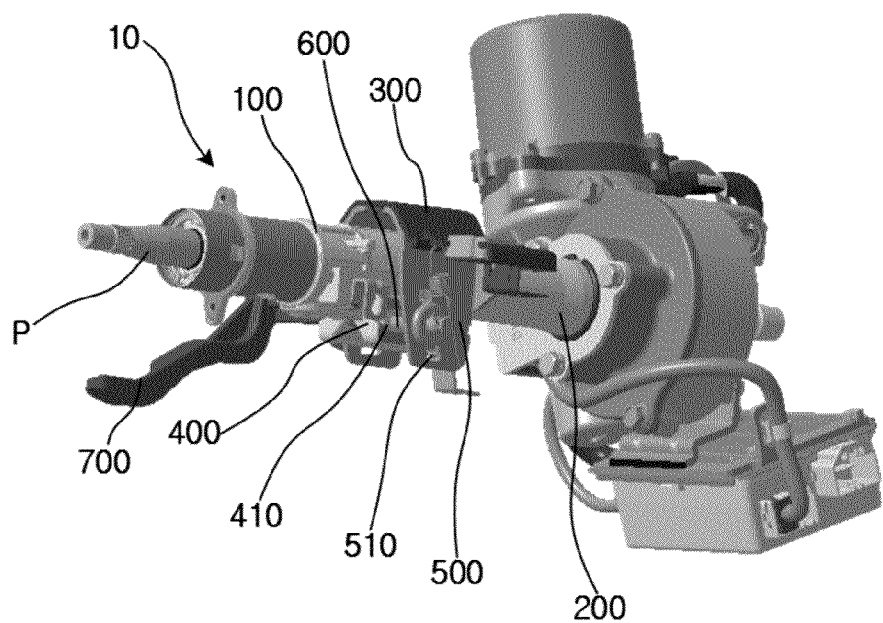
FIG. 1 is a view illustrating an example of a steering system simultaneously having a tilt function and a telescopic function.

Additional objects, advantages, and features of the invention will be more apparent to those of ordinary skill in the relevant art in view of the following detailed description of preferred embodiments and the accompanying drawings. If it is determined that detailed description of known relevant technologies may unnecessarily obscure the gist of the present invention in the description thereof, the detailed description thereof will be omitted. In addition, the thickness of each line or the size of each component illustrated in the drawings may be exaggerated for convenience of description and clarity. Moreover, terms to be described later are terms defined in consideration of functions of the present invention, and these may vary with the intention or practice of a user or an operator. Therefore, such terms should be defined based on the entire content disclosed herein.

Reference will now be made in detail to exemplary embodiments, examples of which are illustrated in the accompanying drawings.

Figure 4:
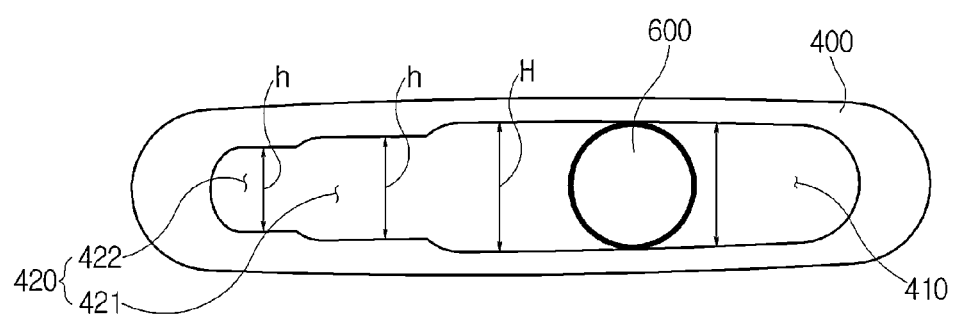
FIG. 4 is a view illustrating an example of a slot for energy absorption applied to a steering column for a vehicle according to an embodiment of the present invention.
Figure 5:
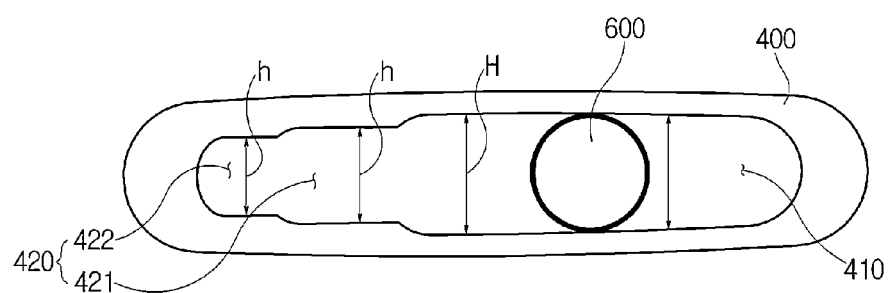
FIG. 5 is a view illustrating another example of a slot for energy absorption applied to the steering column for a vehicle according to the embodiment of the present invention.
Figure 6:
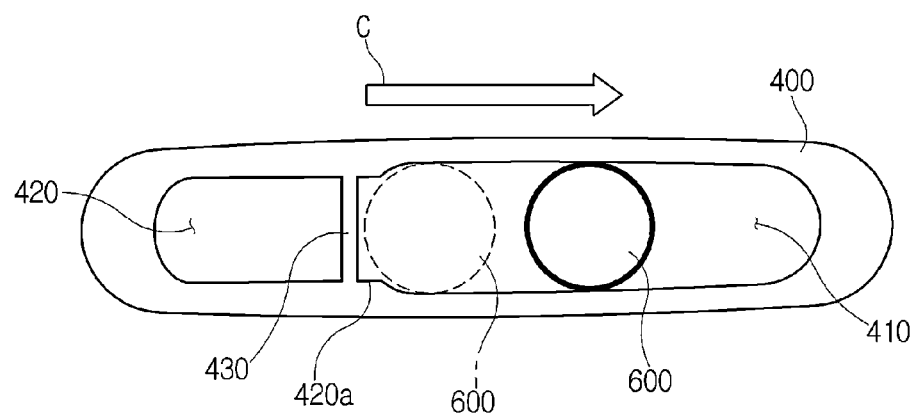
FIG. 6 is a view illustrating a case in which a stopper member is installed to an introduction portion of the slot for energy absorption applied to the steering column for a vehicle according to the embodiment of the present invention.
Figure 7:
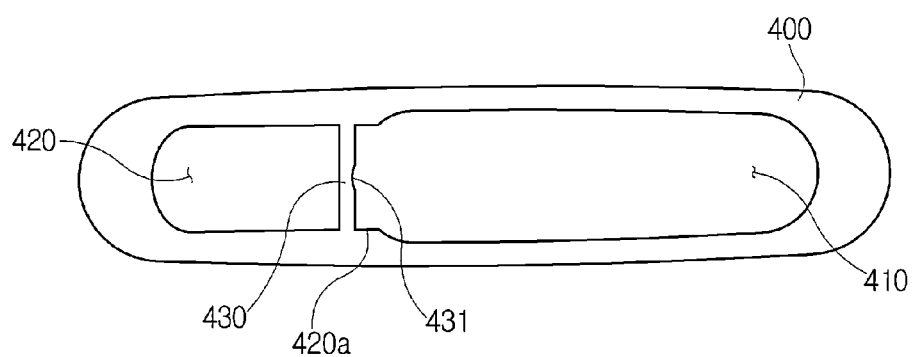
FIG. 7 is a view illustrating a case in which a breaking guide groove is formed on the stopper member installed to the introduction portion of the slot for energy absorption applied to the steering column for a vehicle according to the embodiment of the present invention.
Figure 8:
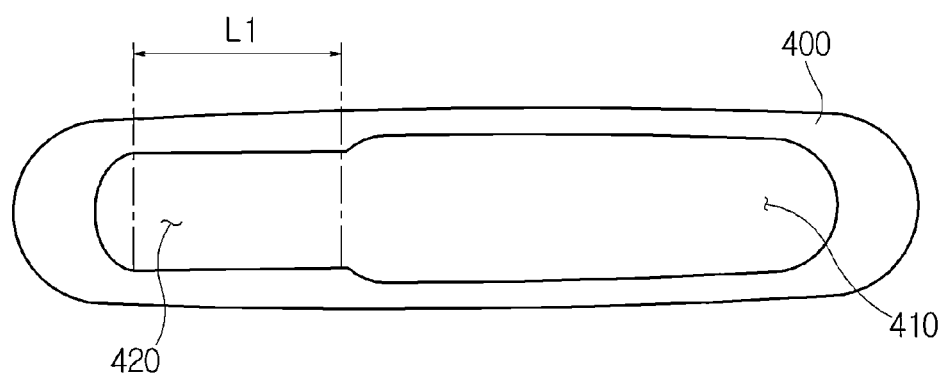
FIG. 8 is a view illustrating any one of a pair of slots for energy absorption formed to the steering column for a vehicle according to the embodiment of the present invention.
Figure 9:
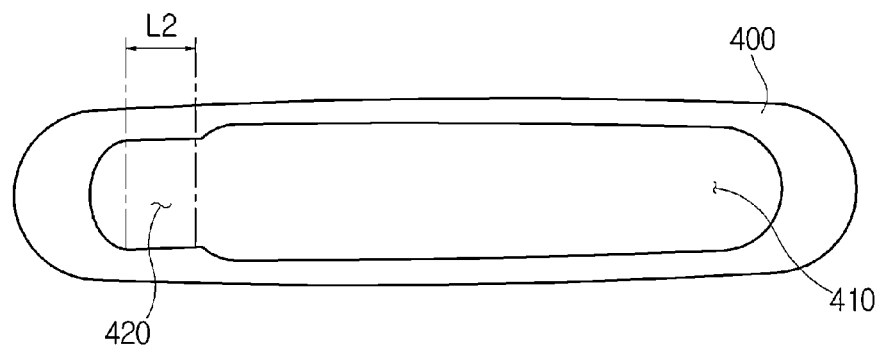
FIG. 9 is a view illustrating the other of the pair of slots for energy absorption formed to the steering column for a vehicle according to the embodiment of the present invention, the other slot for energy absorption having a length different from the slot for energy absorption shown in FIG. 8.

FIG. 4 is a view illustrating an example of a slot for energy absorption applied to a steering column for a vehicle according to an embodiment of the present invention. FIG. 5 is a view illustrating another example of a slot for energy absorption applied to the steering column for a vehicle according to the embodiment of the present invention. FIG. 6 is a view illustrating a case in which a stopper member is installed to an introduction portion of the slot for energy absorption applied to the steering column for a vehicle according to the embodiment of the present invention. FIG. 7 is a view illustrating a case in which a breaking guide groove is formed on the stopper member installed to the introduction portion of the slot for energy absorption applied to the steering column for a vehicle according to the embodiment of the present invention. FIG. 8 is a view illustrating any one of a pair of slots for energy absorption formed to the steering column for a vehicle according to the embodiment of the present invention. FIG. 9 is a view illustrating the other of the pair of slots for energy absorption formed to the steering column for a vehicle according to the embodiment of the present invention, the other slot for energy absorption having a length different from the slot for energy absorption shown in FIG. 8.

Figure 2:
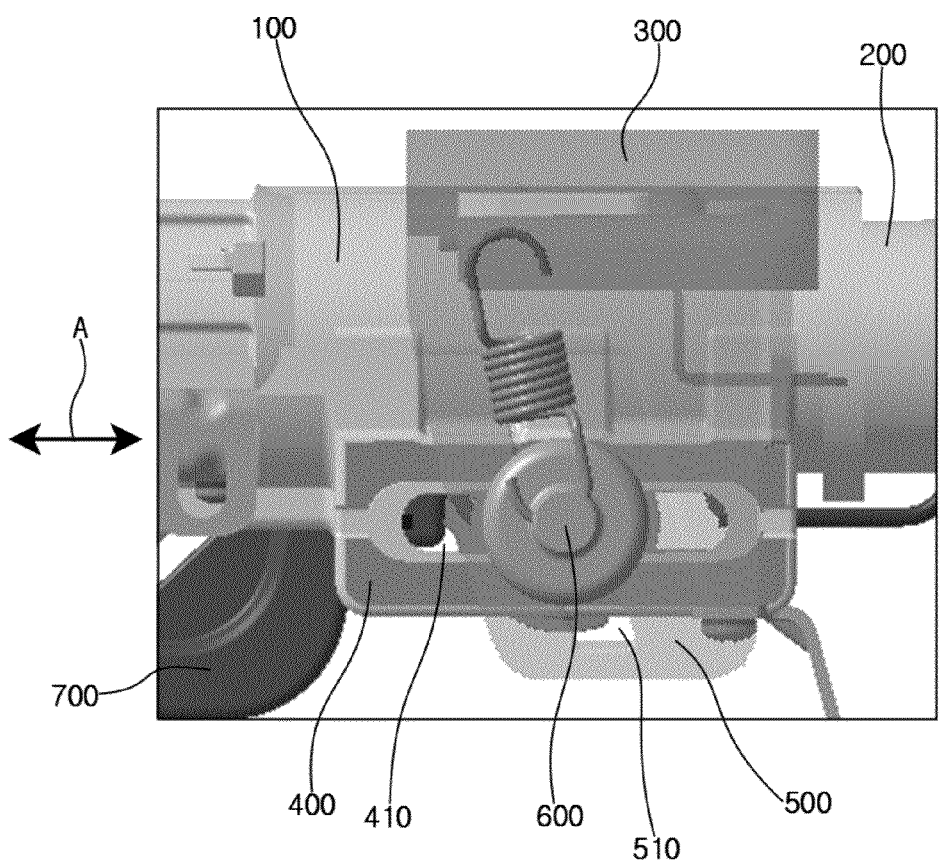
FIG. 2 is a view illustrating a component portion for tilt and telescopic functions.
Figure 3:
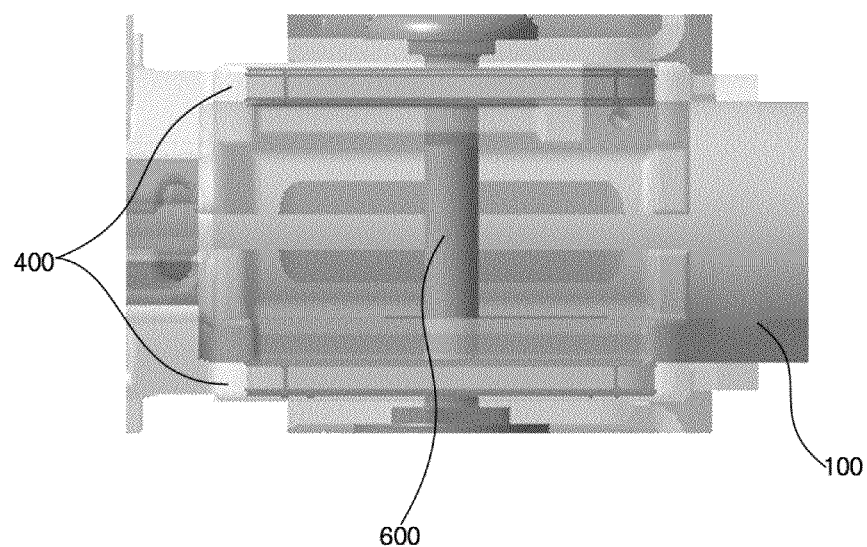
FIG. 3 is a view illustrating a state of the component portion for tilt and telescopic functions shown in FIG. 2 when viewed from the bottom.

Referring to FIGS. 4 to 9 and partially referring to FIGS. 1 to 3 described above, a steering column for a vehicle according to an embodiment of the present invention is similar to the conventional steering column 10 shown in FIGS. 1 to 3 in a whole structure, but differs from the conventional steering column in specific features. That is, the steering column for a vehicle according to the embodiment of the present invention includes an outer tube 100 accommodating a steering shaft P, an inner tube 200 retracted into the outer tube 100, a main bracket 300 which is installed to the outer tube 100 and fixed to a vehicle body, a telescopic bracket 400 which is integrally fixed to the outer tube 100 and formed with a pair of slots for telescoping 410, and a position fixing bolt 600 installed through the slots for telescoping 410. In addition, the steering column may further include a tilt bracket 500 which is formed integrally with the main bracket 300 and formed with a pair of slots for tilting 510. In this case, the pair of slots for tilting 510 is formed at positions through which the position fixing bolt 600 passing through the pair slots for telescoping 410 passes.

Here, the telescopic bracket 400, the tilt bracket 500, and the position fixing bolt 600 are installed for telescopic and tilt functions. As described above with reference to FIGS. 1 to 3, the tilt function of them is a function to enable positions of a steering wheel and the steering shaft P connected with the outer tube 100 to be adapted to be suitable for a driver's body condition by freely setting a position of the outer tube 100 within a range limited up to positions at which the position fixing bolt 600 is caught by both ends of each slot for telescoping 410 when an adjustment lever 700 is pushed and the outer tube 100 is moved in a direction indicated by an arrow A for telescopic adjustment.

Meanwhile, detailed structures and operation of configurations for the telescopic and tilt functions will be omitted since may be readily appreciated by those skilled in the art and to avoid obscuring appreciation of the disclosure.

Meanwhile, the steering column for a vehicle according to the embodiment of the present invention has the following technical features, compared to the conventional steering column 10 described above.

That is, referring to FIGS. 2 to 4, in the steering column for a vehicle according to the embodiment of the present invention, the telescopic bracket 400 is further formed with a slot for energy absorption 420 which extends from at least one of the pair of slots for telescoping 410 and has a height h smaller than a diameter D of the position fixing bolt 600. The slot for energy absorption 420 enables impact energy to be absorbed by means of friction with the position fixing bolt during a vehicle impact.

Accordingly, in a case in which the telescopic bracket 400 moves in a direction indicated by an arrow C as shown in FIG. 4 during a vehicle impact, after the position fixing bolt 600 is located inside the slot for telescoping 410, the position fixing bolt 600 is located at a left end of the slot for telescoping 410 as the time elapses after the vehicle impact, and is then located inside the slot for energy absorption 420. In this case, the diameter D of the position fixing bolt 600 is larger than the height h of the slot for energy absorption 420. Therefore, when the position fixing bolt 600 moves inside the slot for energy absorption 420, an impact is absorbed by generation of friction between an outer peripheral surface of the position fixing bolt 600 and an inner surface of the slot for energy absorption 420.

In addition, in such a process, the telescopic bracket 400 is extensionally deformed due to a size difference between the position fixing bolt 600 and the slot for energy absorption 420. In order to proper deformation of the telescopic bracket 400, the telescopic bracket 400 is preferably made of an elastically deformable material such as plastic, instead of a metal material.

Meanwhile, referring to FIG. 5, the slot for energy absorption 420 may be formed in a multistage structure including two or more partial slots 421 and 422 heights h of which are gradually decreased as the partial slots are away from the slot for telescoping 410. An example shown in FIG. 5 illustrates a case formed with two partial slots 421 and 422. In this case, the height h of the partial slot 421 adjacent to the slot for telescoping 410 is larger than the height h of the outermost partial slot 422.

Accordingly, in a case in which the telescopic bracket 400 moves in the direction indicated by the arrow C as shown in FIG. 4 during a vehicle impact, after the position fixing bolt 600 is located inside the slot for telescoping 410, the position fixing bolt 600 is located at a left end of the slot for telescoping 410 as the time elapses after the vehicle impact, and is then located inside the partial slot 421 of the slot for energy absorption 420. Subsequently, the position fixing bolt 600 is located inside the partial slot 422 smaller than the partial slot 421 as the time further elapses after the vehicle impact.

In this case, the diameter D of the position fixing bolt 600 is larger than the height h of the partial slot 421 of the slot for energy absorption 420. Therefore, when the position fixing bolt 600 moves inside the partial slot 421, an impact is absorbed by generation of friction between the outer peripheral surface of the position fixing bolt 600 and an inner surface of the partial slot 421. Next, when such a process further proceeds, the position fixing bolt 600 moves inside the partial slot 422. In this case, since the size of the partial slot 422 is smaller than that of the partial slot 421, the impact is absorbed by generation of greater friction.

As described above, when the slot for energy absorption 420 is formed in a multistage structure including at least two partial slots 421 and 422, times of action of an impact load may be adapted in a multistage manner, thereby enabling impact absorption to be more efficiently realized.

In addition, when times of action of an impact load are adapted in a multistage manner, it may be possible to more efficiently realize impact absorption by means of adjustment between the times of action of an airbag and the multi-stages times of action of an impact load.

Meanwhile, referring to FIGS. 6 and 7, it is preferable that an introduction portion 420a of the slot for energy absorption 420 is further formed with a stopper member 430 preventing the position fixing bolt 600 from being located in the slot for energy absorption 420 before a vehicle impact more than a certain level is generated in the steering shaft P.

This installation of the stopper member 430 enables prevention of malfunction by which, when excessively large force is applied during operation of the telescopic function regardless of a case where a vehicle impact is not generated, the position fixing bolt 600 may be located in the slot for energy absorption 420.

That is, in a case in which the telescopic bracket 400 moves in a direction indicated by an arrow C as shown in FIG. 6 during operation of the telescopic function, even when the position fixing bolt 600 is located inside the slot for telescoping 410 and then reaches in the vicinity of the slot for energy absorption 420 due to large force applied to the telescopic bracket 400, it may be possible to prevent the position fixing bolt 600 from being located inside the slot for energy absorption 420 by the stopper member 430.

Meanwhile, in a case in which the stopper member 430 has excessively high rigidity during installation of the stopper member 430, the position fixing bolt 600 may not be located inside the slot for energy absorption 420 even when an actual vehicle impact is generated. To this end, the stopper member 430 is preferably formed in a thin wall shape which is capable of being broken such that the position fixing bolt 600 may be located inside the slot for energy absorption 420 when a vehicle impact more than a certain level is generated in the steering shaft P. More preferably, as shown in FIG. 7, the stopper member 430 may be formed with a breaking guide groove 431 leading to breakage of the stopper member 430 when a vehicle impact more than a certain level is generated in the steering shaft P.

Meanwhile, the above-mentioned the slot for energy absorption 420 as a case which extends from at least one of the pair of slots for telescoping 410 formed on the telescopic bracket 400 is applied to a case in which the slot for energy absorption 420 having the same shape is formed at both of the pair of slots for telescoping 410.

However, unlike the example described above, slots for energy absorption 420 may respectively extend from both of the pair of slots for telescoping 410 so as to form a pair of slots for energy absorption. In this case, the slots for energy absorption 420 may be formed to have lengths different from each other. That is, a length L1 of the slot for energy absorption 420 extending from any one of the pair of slots for telescoping 410 shown in FIG. 8 may differ from a length L2 of the slot for energy absorption 420 extending from the other slot for telescoping 410 shown in FIG. 9.

Accordingly, when the pair of slots for energy absorption 420 is formed to have different lengths, it may be possible to obtain an effect similar to the case in which the slot for telescoping 410 is formed in a multistage structure described above with reference to FIG. 5.

In accordance with the above-mentioned steering column for a vehicle according to the embodiment of the present invention, it may be possible to reduce manufacturing costs by a reduction in assembly processes according to a reduction in the number of parts by additionally forming the slot for energy absorption extending from the slot for telescoping on the telescopic bracket to absorb energy during a vehicle impact by means of friction between the slot for energy absorption and the position fixing bolt. In addition, it may be possible to efficiently realize impact absorption since the times of action of an impact load may be adapted in a multistage manner by constituting the slot for energy absorption in a multistage structure.

As is apparent from the above description, in accordance with a steering column for a vehicle, it may be possible to reduce manufacturing costs by a reduction in assembly processes according to a reduction in the number of parts by additionally forming a slot for energy absorption extending from a slot for telescoping on a telescopic bracket to absorb energy during a vehicle impact by means of friction between the slot for energy absorption and a position fixing bolt. In addition, it may be possible to efficiently realize impact absorption since times of action of an impact load may be adapted in a multistage manner by constituting the slot for energy absorption in a multistage structure.

While the present invention has been described with respect to the specific embodiments, it will be apparent to those skilled in the art that various changes and modifications may be made without departing from the spirit and scope of the invention as defined in the following claims.

What is claimed is:

1. A steering column for a vehicle, including an outer tube which accommodates a steering shaft, an inner tube retracted into the outer tube, a main bracket which is installed to the outer tube and fixed to a vehicle body, a telescopic bracket which is integrally fixed to the outer tube and formed with a pair of slots for telescoping, and a position fixing bolt installed through the slots for telescoping, wherein the telescopic bracket is further formed with a slot for energy absorption which extends from at least one of the pair of slots for telescoping and has a height smaller than a diameter of the position fixing bolt, thereby enabling impact energy to be absorbed by means of friction with the position fixing bolt during a vehicle impact.

2. The steering column for a vehicle according to claim 1, wherein the slot for energy absorption is formed in a multistage structure comprising at least two or more partial slots, heights of which are gradually decreased as the partial slots are away from the slot for telescoping.

3. The steering column for a vehicle according to claim 1, wherein an introduction portion of the slot for energy absorption is formed with a stopper member preventing the position fixing bolt from being located in the slot for energy absorption before an impact more than a certain level is applied to the steering shaft.

4. The steering column for a vehicle according to claim 3, wherein the stopper member is formed in a thin wall shape which is capable of being broken such that the position fixing bolt is able to be located inside the slot for energy absorption when an impact more than a certain level is applied to the steering shaft.

5. The steering column for a vehicle according to claim 4, wherein the stopper member is formed with a breaking guide groove leading to breakage of the stopper member when an impact more than a certain level is applied to the steering shaft.

6. The steering column for a vehicle according to claim 1, wherein the slot for energy absorption is configured of a pair of slots for energy absorption such that the slots for energy absorption respectively extend from both of the pair of slots for telescoping and are formed to have lengths different from each other.

* * * * *